United States Patent [19]

Rehberger et al.

[11] 3,908,021

[45] Sept. 23, 1975

[54] PREPARING A NEUTRAL TASTING ALCOHOLIC BASE

[75] Inventors: Arthur J. Rehberger, Milwaukee; Lydia J. Marinelli, West Allis, both of Wis.

[73] Assignee: Jos. Schlitz Brewing Company, Milwaukee, Wis.

[22] Filed: Aug. 17, 1973

[21] Appl. No.: 389,385

[52] U.S. Cl. ............... 426/16; 426/11; 426/29; 426/64
[51] Int. Cl.² ... C12C 1/00; C12C 9/00; C12C 11/00; C12C 11/04
[58] Field of Search ............ 426/11, 13, 14, 16, 28, 426/29, 64

[56] References Cited
UNITED STATES PATENTS

| | | | |
|---|---|---|---|
| 1,455,397 | 5/1923 | Heuser | 426/14 |
| 2,803,546 | 8/1957 | Bergmann et al. | 426/13 |
| 3,168,449 | 2/1965 | Hollenbeck et al. | 426/64 X |
| 3,332,779 | 7/1967 | Krabbe et al. | 426/16 |
| 3,798,331 | 3/1974 | Barisotto et al. | 426/16 |

OTHER PUBLICATIONS

Clerck, J. De, A Textbook of Brewing, Vol. 1, Chapman & Hall, Ltd., London, 1957, (pp. 399–400) TP570C5CEC.2.

*Primary Examiner*—David M. Naff
*Attorney, Agent, or Firm*—Andrus, Sceales, Starke & Sawall

[57] ABSTRACT

A process of preparing a generally neutral-tasting alcoholic base or substrate by fermentation of a boiled, hopped wort and a fermentable carbohydrate. In carrying out the process, a low soluble protein, low-kiln malt is mashed at a temperature of 66°C to 77°C to produce a wort and the wort is boiled for a short period of 5 to 40 minutes. An adjunct is added to the boiled wort and the mixture is immediately cooled to a temperature of below 16°C. Brewer's yeast and a nitrogen-containing compound are then added to the cooled mixture which is fermented under conventional conditions to produce a bland alcoholic substrate which can be subsequently flavored to produce a wide variety of beverages.

7 Claims, No Drawings

PREPARING A NEUTRAL TASTING ALCOHOLIC BASE

BACKGROUND OF THE INVENTION

In the past attempts have been made to achieve a bland or neutral-tasting alcoholic substrate which can be flavored to produce beverages of different types. In order to provide the bland character, unboiled, unhopped wort has been utilized.

The use of a boiled hopped wort is considered to have certain bacteriostatic advantages in brewing processes, but it has generally been accepted in the past that the use of an unboiled sweet wort is necessary to the production of a neutral-tasting alcoholic substrate and that the use of a boiled hopped wort would impart bitter organoleptic impressions to the substrate and destroy its desired bland characteristics.

SUMMARY OF THE INVENTION

The invention relates to a process for producing a generally neutral-tasting or bland alcoholic base or substrate by fermentation of a boiled wort and a fermentable adjunct in the presence of a nitrogen-containing compound. According to the process of the invention, a low soluble protein, low-kiln malt is mashed at an elevated temperature of 66°C to 77°C to produce a wort and the wort is kettle boiled for a period of 5 to 40 minutes. An adjunct, which contains from 40% to 95% by weight of fermentable carbohydrate and, in some cases, an isomerized hop extract, are blended with the boiled wort, with the adjunct being present in an amount of 70% to 95% by weight of the combined mixture of adjunct and wort on a solids basis. Standard brewer's yeast and a nitrogen-containing compound, such as ammonium phosphate, are added to the mixture which is then fermented under conventional fermentation techniques.

The resulting fermented base is generally neutral in flavor and relatively colorless, and various flavoring constituents can be added to the base to produce a wide variety of beverages. For example, the base can be utilized to provide a simulated wine or a cocktail type drink or can be diluted with concentrated fruit juice to produce a fruit-type beverage.

By using a low soluble protein, low-kiln malt in combination with a high mashing temperature and a short kettle boil, a generally neutral-tasting substrate is obtained from either the boiled wort or the boiled hopped wort.

DESCRIPTION OF THE PREFERRED EMBODIMENT

The malt to be used in mashing is what is generally referred to in the trade as a low soluble protein, low-kiln malt and differs considerably from conventional brewer's malt and distiller's malt. The low soluble protein, low-kiln malt has a moisture content of approximately 5% to 6% by weight, higher than that of normal brewer's malt, which generally has a moisture content of less than 4% by weight. In addition, low-kiln malt has a lower percentage of soluble protein, with respect to total protein, of about 30% to 37% by weight, as compared to conventional brewer's malt which is classically about 40% by weight.

As a further distinction, low-kiln malt has a diastase value of about 200 and normally in the range of 150 to 240, as compared to standard brewer's malt which has a diastase value generally in the range of 120 to 130.

The malt is mashed in which brewing water at a temperature in the range of 66°C to 77°C and preferably about 68°C to 71°C and is held at that temperature for a period of 30 to 90 minutes, and preferably about 75 minutes. This mashing procedure differs from conventional mashing practice wherein the malt is normally mashed in with water at a lower temperature of about 38°C. to 60°C. and held at this temperature for a "protein rest" period of 15 to 60 minutes. Following the protein rest period, the mash, in conventional practice, is heated to the conversion temperature of about 65°C to 73°C. In contrast to conventional practice, the malt in the process of the invention is not subjected to a lower temperature protein rest period, but instead is mashed in at the conversion temperature. The protein rest is eliminated in order to reduce the solubilization of proteins and the resulting darkening of color and intensified flavor characteristics which normally accompany the solubilization of proteins. This is directly opposed to historical techniques which considered the protein rest period to be of utmost importance.

Following the mashing, the first wort is separated from the spent grains by filtering, lautering or centrifuging, and the spent grains are sparged with brewing water at a temperature of 54°C to 93°C, and the resulting dilute wort is delivered with the first wort to the kettle.

The adjunct to be used in the process is diluted with heated brewing water at a temperature of about 93°C to provide a mixture of the desired gravity, generally in the range of about 9° to 28° Plato and preferably about 15° Plato. As an alternative, the water dilution can be accomplished by adding water to the wort before it is mixed with the adjunct or it can be added to the mixture as a final dilution. On a solids basis, the adjunct comprises about 70% to 95% by weight of the combined mixture of wort and adjunct.

The adjunct contains from 40% to 95% by weight of fermentable carbohydrate and may be a monosaccharide, a disaccharide, or a polysaccharide and may take the form of corn syrup, dextrose, sucrose, maltose, refined molasses, invert syrup, hydrolyzed vegetable starch, conversion solutions, thinned vegetable starch slurries, and the like.

A conventional isomerized hop extract can be added to the adjunct solution. As the kettle boil is of short duration hops cannot be added to the kettle, for the isomerization of the hops would not be completed within the period of the kettle boil. The isomerized hop extract can be a pre-prepared extract, or hops can be boiled in a separate vessel while the process is being carried on to obtain the isomerized hop extract. The isomerized hop extract is added in an amount equivalent to at least 7 pounds of 4% alpha acid hops per 100 bbl. of fermentable substrate.

The wort is boiled in the kettle for a period of 5 to 40 minutes and preferably 10 to 20 minutes, and after this period the boil is discontinued and a buffering agent, such as gypsum, can then be added to the kettle, if desired, to control the pH.

The mixture of the adjunct and isomerized hop extract is then added to the boiled wort in the kettle to achieve sterilization of the adjunct solution, and the resulting mixture is pumped to the hot wort tank and then immediately pumped over a wort cooler to cool the fermentable substrate to a temperature in the range of 7°C to 24°C in preparation for fermentation. Rather than combining the wort and the adjunct prior to delivery to the fermenter, it is contemplated that the adjunct solution can be separately sterilized and added directly to the fermenter along with the boiled wort.

Conventional brewer's yeast is utilized for fermentation, such as the species *Saccharomyces cerevisiae* or *Saccaromyces carlsbergensis*.

To supply nitrogen for fermentation, a nitrogen-containing material is added to the cooled extract to be fermented. The nitrogen-containing material is added in an amount sufficient to provide the extract to be fermented with a nitrogen content in the range of 50 to 500 ppm, and is preferably a water-soluble ammonium salt of a food-compatible acid. Acids such as phosphoric, citric, fumaric, malic, tartaric, lactic, acetic, and the like may be employed to form the ammonium salt. Other food-compatible, nitrogen-containing materials, such as urea and amino acids can be substituted for, or added with, the ammonium salts. Examples of amino acids which can be used as the nitrogen-containing material are glycine, alanine, aspartic acid, glutamic acid, cysteine, tryptophan, leucine, arginine, and the like. In addition, water-soluble salts of the amino acids can be substituted for the amino acids. The addition of the nitrogen-containing material provides nitrogen for yeast production, thereby increasing the rate of fermentation.

The fermentation is carried out at a temperature in the range of 7.2°C to 21°C and preferably in the range of 10°C to 15.6°C. It is preferred to ferment the extract with continuous agitation with a process as illustrated in U.S. Pat. No. 3,484,244, and the fermentation is carried on to an end Plato of approximately 3.0° and a VDK level of less than 0.1 ppm. The resulting fermented substrate has an alcohol content in the range of 3.0% to 6.0% by weight.

After fermentation, the fermented substrate is processed according to traditional techniques. The substrate is discharged from the fermenting tank and the yeast is preferably removed by centrifugation. Following the removal of the yeast, the substrate is delivered to a storage or maturation tank where it is stored in ruh at a temperature of 0°C to 7°C for a period of 1 to 10 days for aging and clarification. Activated carbon can be added during the ruh storage to aid in cutting back flavor and color in the substrate. After the ruh storage period, the substrate is prefiltered using a material such as diatomaceous earth or kaolin as the filtering medium, and it can then be subjected to the action of color-removal agents, if desired, to remove any remaining color in the substrate. The substrate is then stored for an additional period of one to two days.

Both the ruh storage and the storage following the prefiltering are not critical, and the storage serves to clarify the substrate and develop aromatic flavor characteristics, if such flavor characteristics are desired.

After the second storage, the base is polish filtered and can be carbonated if desired to approximately 3.5 volumes of carbon dioxide.

The resulting alcoholic base is a relatively neutral-tasting and colorless liquid, and various flavoring extracts and coloring constituents can be added to the base to provide a wide variety of beverage types. For example, flavoring extracts such as champagne, ginger, catawaba, lemon, cherry, and lime can be added to the base to establish the desired flavor characteristics. In some cases, food-compatible acids, such as citric acid, tartaric acid, malic acid, and the like, can be added to the base to provide a more acidic flavor, if desired. Furthermore, food-grade silicone anti-foaming agents can be added to the base to eliminate foaming characteristics, while clouding preparations, such as brominated oils, can be employed to provide the beverage with a cloudy, citrus-like appearance. Anti-oxidants, such as ascorbic acid, can also be added to the base to provide flavor stability. As the base is generally colorless, various coloring agents can be added to provide the desired food color effect.

As previously noted, the base can be carbonated in the filtration process with a conventional carbonating arm, or carbonating stones can be employed in the storage tank prior to bottling. In either case, the carbonating operation is conventional and is similar to that employed in the preparation of other carbonated beverages. On the other hand, if a non-carbonated, wine-like beverage is desired, the carbonation developed during fermentation can be removed.

The manner in which the flavoring extracts and other additives are mixed with the fermented base is not critical. In some cases conventional soft drink bottling equipment can be used in which the flavoring extract and other additives are added to the bottle and the bottle is then filled with the base, while in other cases the flavoring extracts or additives can be mixed with the base in the pipe line or tank by means of an injection system and the mixture is then introduced into the bottles.

As the fermented base has a relatively low pH, generally in the range of 3.0 to 3.5, it is not normally necessary to heat pasturize or sterilize the beverage to prevent microorganism growth. However, if under certain conditions where a sweeter beverage is desired and sterilization is required, it can be achieved by the addition of conventional cold-sterilizing materials. The beverage containing flavoring extracts should not be subjected to heat pasteurization as the flavoring extracts are generally heat sensitive and may deteriorate if subjected to the heat of sterilization.

The following specific examples illustrate the process of the invention:

EXAMPLE NO. I 4,500 pounds of a low soluble protein, low-kiln malt having a moisture content of 6.1% by weight and a soluble protein content with respect to total protein of 35.4% by weight, and a diastase (ASBC salt) value of 204 was mashed in with 52 bbl. of brewing water at 70°C and held at that temperature for 1 hour. The mixture was then transferred to a conversion tank, and after a total mash time of 1½ hours at 70°C, the mixture was transferred to a filter press. The first wort was run off and the residue was sparged with 60 bbl. of brewing water at 75°C to thereby deliver approximately 110 bbl. of wort to the kettle.

10,895 pounds of Sweetose (corn syrup, 78% fermentable carbohydrate, dry basis) was blended with 170 bbl. of brewing water at 66°C and 4.8 pounds of isomerized hop extract were added to the corn syrup solution and held.

The wort in the brewing kettle was boiled for 15 minutes. After this boiling period, 10 pounds of gypsum was added to control the pH at 5.5, and the corn syrup solution was then transferred to the kettle and the resulting extract was pumped to the hot wort tank and immediately pumped over the wort cooler to cool to 16°C.

46.5 pounds of ammonium phosphate (monobasic) was added to 15 gallons of water in the empty fermenter. The wort-corn syrup extract was added to the fermenter and aerated to saturation (9.0 ppm dissolved oxygen) and pitched with 15–17 million yeast cells per ml of fermentable extract. The yeast was the species *Saccharomyces carlsbergensis*.

The extract was fermented at 16°C with continuous agitation to an end Plato of approximately 3° and a VDK value of less than 0.1 ppm.

Following fermentation the yeast was removed by centrifugation and the fermented substrate was cooled to 0°C and transferred to ruh storage. 15 pounds of activated charcoal per 100 bbl. was added to the fermented substrate which was held in ruh storage for a period of 5 days.

Following the ruh storage the fermented substrate was prefiltered to a clarity of 1.0 ppm Kaolin and held in prefiltration storage for 2 days at 0°C. After this storage period, the substrate was polish filtered and carbonated to 3.5 volumes of $CO_2$ to produce a relatively neutral tasting, substantially colorless fermented product with an alcohol content of approximately 5% by weight.

EXAMPLE NO. II 6,450 lb. of low-soluble protein, low kiln malt having a moisture content of 5.6% by weight, a soluble protein content with respect to total protein of 35.7% by weight and a diastase (ASBC) salt value of 209 was mashed with 80 bbl. of brewing water at 71°C and held at that temperature for 1½ hours. The mash was pumped to the mash filter and sparged with 90 bbl. of brewing water at 75°C.

The wort was brought to a boil in the brew kettle and 10 lb. of gypsum was added to control the pH at 5.6. The boil was maintained for 15 minutes.

15,295 lb. of adjunct (83% solids, 76% fermentable carbohydrate, dry basis) was blended with approximately 280 bbl. of water at 65°C and 7 lb. of isomerized hop extract. This mixture was then pumped to the hop jack where it was mixed with the wort.

The substrate was cooled to 16°C aerated to 9 ppm dissolved oxygen and pumped to the fermenter containing 67 lb. ammonium phosphate in 25 gal. of water. The substrate was pitched with 15 to 17 million yeast cells (species *Saccharomyces carlsbergensis*) per ml. and fermented at 16°C under constant agitation to an apparent extract of 1.6° Plato with a VDK level of less than 0.1 ppm and an alcohol content of approximately 5% by weight.

After fermentation, the yeast was removed by centrifugation and the fermented base was cooled to 0°C and transferred to ruh storage. After 5 days in ruh storage, the fermented base was filtered to a clarity of 1.0 ppm Kaolin and chill proofed with 14 ppm papain. The fermented base was polish filtered after 3 days storage at 0°C and carbonated to 3.0 volumes of $CO_2$.

100 barrels of the fermented base at 0°C was flavored in the following manner: A color/flavor blend was prepared containing: 47 lb. water, 47 lb. citric acid, 175 l lb. of a dextrose/levulose solution at 68% solids, 3.35lb. bitter lemon, 2.5 l lb. imitation grape, 1.1 l lb. essence of lime, 0.56 lb. imitation plum, 0.56 lb. natural cura- cao and 0.11 lb. F D & C Red No.40 color. The fermented base was in a holding tank equipped with a recirculation line and pump. The color/flavor blend was blended into the recirculation line on the suction side of the pump which discharged back into the holding tank. The blended mixture was recirculated in the holding tank until a homogenous mixture was obtained.

EXAMPLE NO. III 1155 grams of low soluble protein, low-kiln malt having a moisture content of 5.6% by weight and a soluble protein content with respect to total protein of 35.7% by weight and a diastase (ASBC salt) value of 209 was mashed in with 4 liters of brewing water at 70°C and held at that temperature for one hour. The mixture was then transferred to a conversion tank, and after a total mash time of 1¼ hours at 70°C, the mixture was transferred to a lauter tun. The first wort was run off and the residue was sparged with 5 liters of brewing water at 75°C to thereby deliver approximately 9 liters of wort to the kettle. 2840 grams of corn syrup (62% fermentable) was blended with 10 liters of brewing water at 66°C and 1.2 grams of isomerized hop extract were added to the corn syrup solution and held.

The wort in the brewing kettle was boiled for 15 minutes. After this boiling period, 6.8 gr. of gypsum was added to control the pH at 5.8, and the corn syrup solution was then transferred to the kettle and the resulting extract was pumped to the hot wort tank and immediately pumped over the wort cooler to cool to 16°C.

11 grams of ammonium phosphate (monobasic) was added in 100 ml of water to the empty fermenter. The wort-carbohydrate extract was added to the fermenter and aerated to saturation (9.0 ppm dissolved oxygen) and pitched with 15–17 million; yeast cells per ml of the fermentable extract. The yeast was species *Saccharomyces carlsbergensis*.

The extract was fermented at 16°C with continuous agitation to an end Plato of approximately 4.2° and a VDK value of less than 0.1 ppm.

Following fermentation the yeast was removed by centrifugation and the fermented substrate was cooled to 0°C and transferred to ruh storage and held for a period of 5 days.

Following the ruh storage the fermented substrate was prefiltered to a clarity of 1.0 ppm Kaolin and held in prefiltration storage for 2 days at 0°C. After this storage period the substrate was polish filtered and carbonated to 3.5 volumes of $CO_2$ to produce a relatively neutral-tasting, substantially colorless fermented product with an alcohol content of approximately 5% by weight.

EXAMPLE NO. IV 1470 grams of low soluble protein, low-kiln malt having a moisture content of 5.6% by weight and a soluble protein content with respect to total protein of 35.7% by weight, and a diastase (ASBC salt) value of 209 was mashed in with 4 liter of brewing water at 70°C and held at that temperature for 1 hour. The mixture was then transferred to a conversion tank, and after a total mash time of 1¼ hours at 70°C, the mixture was transferred to a lauter tun. The first wort was run off and the residue was sparged with 5 liters of brewing water at 75°C to thereby deliver approximately 9 liters of wort to the kettle.

3497 grams of corn syrup (45.7% fermentable) was blended with 10 liter of brewing water at 66°C and 1.2 grams of isomerized hop extract were added to the corn syrup solution and held.

The wort in the brewing kettle was boiled for 15 minutes. After this boiling period, 6.8 grams of gypsum was added to control the pH at 5.5, and the corn syrup solution was then transferred to the kettle and the resulting extract was pumped to the hot wort tank and immediately pumped over the wort cooler to cool to 160°C.

11 grams of ammonium phosphate (monobasic) was added in 100 ml of water to the empty fermenter. The wort-carbohydrate extract was added to the fermenter and aerated to saturation (9.0 ppm dissolved oxygen) and pitched with 15–17 million yeast cells per ml of the fermentable extract. The yeast was the species *Saccharomyces carlsbergensis*.

The extract was fermented at 16°C with continuous agitation to an end Plato of approximately 8.6° and a VDK value of less than 0.1 ppm.

Following fermentation the yeast was removed by centrifugation and the fermented substrate was cooled to 0°C and transferred to ruh storage and held for a period of 5 days.

Following the ruh storage the fermented substrate was prefiltered to a clarity of 1.0 ppm Kaolin and held in prefiltration storage for 2 days at 0°C. After this storage period the substrate was polish filtered and carbonated to 3.5 volumes of $CO_2$ to produce a relatively neutral-tasting, substantially colorless fermented product with an alcohol content of approximately 5% by weight.

Various modes of carrying out the invention are contemplated as being within the scope of the following claims particularly pointing out and distinctly claiming the subject matter which is regarded as the invention.

We claim:

1. A method of preparing a neutral tasting alcoholic base, comprising the steps of mixing a low soluble protein, low-kiln malt with water at a temperature in the range of 66°C to 77°C to provide a mash, said malt having a moisture content in the range of 5% to 6% by weight, a diastase value in the range of 150 to 240, and a soluble protein content based on total protein in the range of 30% to 37% by weight, maintaining the mash at said temperature for a period of time sufficient to provide a wort, boiling the wort for a period of 10 to 40 minutes, mixing the boiled wort with an adjunct containing from 40% to 95% by weight of fermentable carbohydrate to provide a fermentable extract, said adjunct being present on a solids basis in the amount of 70% to 95% by weight of the combined weight of said wort and said adjunct, adding brewer's yeast to said extract, adding to the extract prior to fermentation a water-soluble, food-compatible nitrogen-containing compound in an amount sufficient to provide a nitrogen content of 50 to 500 ppm in the extract, fermenting the extract to provide a fermented substrate, and thereafter removing the yeast from the substrate to provide a neutral-tasting alcoholic substrate.

2. The method of claim 1, wherein the nitrogen-containing compound is ammonium phosphate.

3. The method of claim 2, wherein the extract is fermented at a temperature in the range of 7.2°C to 21°C.

4. The method of claim 1, and including the step of mixing an isomerized hop constituent with said fermentable extract.

5. The method of claim 1, wherein said mash is maintained at said temperature for 30 to 90 minutes.

6. A method of preparing a neutral tasting alcoholic base, comprising the steps of mixing a low soluble protein-low-kiln malt with water at a temperature in the range of 66°C to 77°C to provide a mash, said malt having a moisture content in the range of 5% to 6% by weight, a diastase value in the range of 150 to 240, and a soluble protein content based on total protein in the range of 30 to 37% by weight, maintaining the mash at said temperature for a period of time of 30 to 90 minutes to produce a wort, boiling the wort for a period of 10 to 40 minutes, mixing the boiled wort with an adjunct containing from 40% to 95% by weight of fermentable carbohydrate and an isomerized hop constituent to provide a fermentable extract, said hop constituent being present in an amount equivalent to at least 7 pounds of 4% alpha acid hops per 100 barrels of said fermentable extract, said adjunct being present on a solids basis in the amount of 70% to 95% by weight of the combined weight of said wort and said adjunct, adding to the extract prior to fermentation a water-soluble, food-compatible nitrogen-containing compound in an amount sufficient to provide a nitrogen content of 50 to 500 ppm in the extract, adding brewer's yeast to said extract, fermenting the extract to provide a fermented substrate, and thereafter removing the yeast from the substrate to provide a neutral-tasting alcoholic substrate.

7. The method of claim 6, and including the step of diluting the adjunct with water prior to mixing the adjunct with said wort to provide an adjunct solution having a gravity of 9° to 28° Plato.

* * * * *